(12) United States Patent
Kean

(10) Patent No.: US 12,385,230 B2
(45) Date of Patent: Aug. 12, 2025

(54) GENERATION FOR EARTH-MOVING OPERATIONS

(71) Applicant: LEICA GEOSYSTEMS TECHNOLOGY A/S, Odense SØ (DK)

(72) Inventor: Michael Goulet Kean, Odense SØ (DK)

(73) Assignee: LEICA GEOSYSTEMS TECHNOLOGY A/S, Odense SØ (DK)

( * ) Notice: Subject to any disclaimer, the term of this patent is extended or adjusted under 35 U.S.C. 154(b) by 287 days.

(21) Appl. No.: 18/212,077

(22) Filed: Jun. 20, 2023

(65) Prior Publication Data

US 2023/0407605 A1 Dec. 21, 2023

(30) Foreign Application Priority Data

Jun. 21, 2022 (EP) ..................... 22180149

(51) Int. Cl.
*E02F 9/26* (2006.01)
*E02F 5/14* (2006.01)
(Continued)

(52) U.S. Cl.
CPC .............. *E02F 9/262* (2013.01); *E02F 5/145* (2013.01); *G05B 17/02* (2013.01);
(Continued)

(58) Field of Classification Search
CPC ...... E02F 5/145; E02F 9/262; G06F 3/04842; G06F 3/04845; G06F 3/04883; G06T 7/70; G06T 17/05; H04N 7/183
See application file for complete search history.

(56) References Cited

U.S. PATENT DOCUMENTS

| | | | | |
|---|---|---|---|---|
| 9,963,836 | B1* | 5/2018 | Brenner | ................. G01B 17/06 |
| 2011/0285633 | A1* | 11/2011 | Bathiche | ............... G06F 3/0421 |
| | | | | 345/168 |

(Continued)

FOREIGN PATENT DOCUMENTS

| | | |
|---|---|---|
| EP | 3 086 196 A1 | 10/2016 |
| EP | 4095561 A1 | 5/2021 |

(Continued)

OTHER PUBLICATIONS

Extended European Search Report dated Dec. 23, 2022 as received in Application No. 22180149.1.

*Primary Examiner* — Seth A Silverman
(74) *Attorney, Agent, or Firm* — Maschoff Brennan

(57) ABSTRACT

A system for planning an earth-moving operation to be performed by a construction machine having a tool for performing the earth-moving operation and a machine control unit for at least partially controlling the earth-moving operation, the system comprising a measuring system configured for capturing 3D measuring data of an uneven terrain in a surrounding of the construction machine, a context camera having a known position relative to the measuring system and/or the 3D measuring data and being configured for capturing context image data of the terrain, a user interface configured for displaying at least one context image to an operator of the construction machine and for receiving user input from the operator, and a computing unit operatively coupled at least with the measuring system and the user interface.

18 Claims, 8 Drawing Sheets

(51) Int. Cl.
G05B 17/02 (2006.01)
G06F 3/04842 (2022.01)
G06F 3/04845 (2022.01)
G06F 3/04883 (2022.01)
G06T 7/70 (2017.01)
G06T 17/05 (2011.01)
H04N 7/18 (2006.01)

(52) U.S. Cl.
CPC ...... G06F 3/04842 (2013.01); G06F 3/04845 (2013.01); G06F 3/04883 (2013.01); G06T 7/70 (2017.01); G06T 17/05 (2013.01); H04N 7/183 (2013.01); *G06T 2200/04* (2013.01); *G06T 2200/24* (2013.01); *G06T 2207/20092* (2013.01)

(56) References Cited

U.S. PATENT DOCUMENTS

| | | | |
|---|---|---|---|
| 2014/0359405 A1* | 12/2014 | Hou | G06F 16/9577 715/202 |
| 2021/0047804 A1* | 2/2021 | Canepari | G06T 17/20 |
| 2022/0108529 A1* | 4/2022 | Mitchell | G06T 19/003 |
| 2022/0375175 A1* | 11/2022 | Lynch | G06T 17/00 |

FOREIGN PATENT DOCUMENTS

| | | |
|---|---|---|
| EP | 3 865 895 A1 | 8/2021 |
| JP | 2019-167719 A | 10/2019 |
| WO | 2019/197064 A1 | 10/2019 |
| WO | 2020/126123 A2 | 6/2020 |

* cited by examiner

GENERATION FOR EARTH-MOVING OPERATIONS

BACKGROUND

The present disclosure generally relates to controlling a construction machine for performing an earth-moving operation such as digging a trench, and more particularly to a method and system allowing an operator of the construction machine a simplified design generation in the field, the design comprising 3D coordinates that can be provided to a machine control unit of the construction machine for at least partially controlling the earth-moving works.

It is known to use automation systems for construction machines to facilitate earth-moving operations for the operator of the machine by fully or partially controlling the machine. Existing automation systems focus primarily on a final grading pass required to cut the soil surface to the desired profile. There are two primary applications that differ based on whether the desired profile is localized relative to world coordinates ("3D system"), or the desired profile is localized relative to vehicle coordinates ("2D system"). 2D systems are simpler to work with. A soil profile is designed relative to the vehicle system and the operator is fully responsible for navigating the vehicle so that the system generates the correct surface. 3D systems require a surface design file that is created using a complex computer system. The machine can then be localized relative to the 3D plan and the surface cut correctly with a variety of possible navigation motion.

There are various measuring systems known for the specific needs in the field of construction, especially for earth-moving machines, such as excavators, graders or dozers. Such measuring systems can be used with a construction machine to build a digital 3D model of the surroundings of the machine, to detect obstacles in the surroundings of the machine, and/or to support a control of the construction machine. For example, EP 3 086 196 A1 suggests an environment detection by means of a camera system arranged on a bulldozer. The camera system uses a SLAM or SfM algorithm to generate a 3D point cloud of the environment. JP 2019 167 719 A2 discloses a 2D laser scanner by means of which a 3D model of the environment is generated when an excavator, on which the 2D scanner is mounted, is pivoting. WO 2019/197064 A1 shows a device for monitoring a construction machine environment with a ToF camera. Images generated in such a way are used for guiding an operator of the construction machine in order to control the operation of the construction machine on the construction site according to a plan.

Advances in perception sensors allow for a new interactive workflow that enables a 3D design surface to be generated in a simpler manner, resembling that of existing 2D systems. These same perception sensors allow for the machine to localize itself relative to coordinates of a design file and enable advancements in the automation of the machine so that the automation systems can be used in a wider range of operator conditions. WO 2020/126123 A2 discloses an example of a compact "reality capture device" comprising a laser scanner and at least one camera. With this reality capture device, an environment can be optically scanned and measured by means of the laser scanner emitting a laser measurement beam, e.g. using pulsed electromagnetic radiation, wherein an echo is received from a backscattering surface point of the environment and a distance to the surface point is derived and associated with an angular emission direction of the associated laser measurement beam. This way, a three-dimensional point cloud is generated. For example, the distance measurement may be based on the time of flight, the shape, and/or the phase of the pulse. For additional information, the laser scanner data is combined with camera data, in particular to provide high-resolution spectral information, e.g. by means of an RGB camera or an infrared camera. The reality capture device may be mobile and configured to provide surveying data and referencing data at the same time, e.g. wherein at least trajectory data of the device, e.g. position and/or pose data, are provided with the probing data, e.g. laser scanner data and/or camera data, such that probing data of different positions of the reality capture device can be combined into a common coordinate system. The reality capture devices can be configured to autonomously create a 3D map of a new environment, e.g. by means of a simultaneous localization and mapping (SLAM) functionality. The European patent application No. 21176387.5 discloses a similar reality capture device comprising an arrangement of time-of-flight (ToF) cameras instead of a laser scanner, wherein the ToF cameras are configured for jointly capturing 3D point cloud data of the surrounding.

EP 3 865 895 A1 discloses a measurement system for construction machines comprising one or more reality capture devices for capturing surroundings of the construction machine before and during earthmoving works at a construction site.

SUMMARY

It would be desirable to provide a construction site measuring system for a construction machine that can be used in the field for a simplified design generation for earthmoving works.

It is therefore an object of the present disclosure to provide an improved system and method that allow an operator of a construction machine to create a design for an earthmoving operation.

It is a further object of the disclosure to provide such a system and method that allow creating the design in the field, i.e. directly on the construction site of the earthmoving operation.

It is a further object of the disclosure to provide such a system and method that allow creating the design fast and in an intuitive way.

It is a further object of the disclosure to provide such a system and method that allow creating a design that can be used as input for an automation system of the construction machine, which assists the operator in performing the earth-moving operation, particularly wherein the system and method allow creating the design so that the construction machine can be localized relative to design features while performing the earth-moving operation.

A first aspect of the disclosure relates to a system for planning an earth-moving operation to be performed by a construction machine, wherein the construction machine has a tool for performing the earth-moving operation and a machine control unit for at least partially controlling the earth-moving operation.

According to this aspect, the system comprises:
  a measuring system configured for capturing 3D measuring data of an uneven terrain in a surrounding of the construction machine in at least a first detection range;
  a context camera having a known position relative to the measuring system and/or the 3D measuring data and being configured for capturing context image data of the terrain within the first detection range;

a user interface configured for displaying at least one context image based on the context image data to an operator of the construction machine, and for receiving user input from the operator, the user input being interpretable as or comprising a selection of pixels of the context image; and a computing unit operatively coupled at least with the measuring system and the user interface.

The computing unit is configured for:

generating, based on the 3D measuring data, a 3D terrain model of the terrain within the first detection range, interpreting the user input as a selection of pixels of the context image;

mapping, taking into consideration the known relative position of the context camera, the selection of pixels to a surface of the 3D terrain model;

determining 3D coordinates on the surface based on the mapping; and providing the 3D coordinates to the machine control unit for at least partially controlling the earth-moving operation based on the 3D coordinates.

According to some embodiments of the system, the measuring system comprises at least one measuring unit at the construction machine, each measuring unit comprising at least one laser scanner and/or a plurality of ToF cameras and being configured for capturing 3D point cloud data.

According to some embodiments of the system, the user interface comprises a touch-sensitive display (touchscreen) on which the context image is displayed and on which the user input is received, wherein the user input is interpretable as or comprises a selection of at least one line or polygon of pixels of the context image.

In some embodiments, the earth-moving operation comprises constructing a linear structure, and the line or polygon indicates a position and/or direction of the linear structure. For instance, the linear structure may be a road bed, a track bed, an embankment, a causeway, a dam, a cut, a trench or a ditch. Optionally, the user input may comprise an indication that the earth-moving operation comprises constructing a linear structure. In one embodiment, at least one line indicates a centreline or an edge of the linear structure. In another embodiment, the user input comprises a selection of a desired slope of the linear structure.

In some embodiments, the linear structure is a trench or a ditch, the user input comprises a selection or indication of a desired extrusion shape of the trench or ditch, and the computing unit is configured for analysing the user input to determine whether it comprises one or more changes in the direction of the trench or ditch, and, in response to detecting direction changes, for adapting the determined 3D coordinates by enforcing a minimum turning radius based on the extrusion shape, determining intersections of the extrusions, e.g. in the case of a sharp change in direction, and/or adding a piecewise linear approximation of a radius in the extrusion shape.

According to some embodiments of the system, the user interface is configured to receive the determined 3D coordinates from the computing unit and to display a representation of the 3D coordinates in the context image. In one embodiment, the user interface is also configured to display the selection of pixels in the context image. In another embodiment, the earth-moving operation comprises digging a trench and the representation comprises a spline projected into a locally horizontal plane indicating a position and direction of the trench.

A second aspect of the disclosure pertains to a construction machine, for instance a grader, a dozer or an excavator, the construction machine comprising a tool for performing an earth-moving operation, e.g. for digging a trench;

a control unit for at least partially controlling the earth-moving operation; and a system according to the first aspect of the disclosure, the system either being operatively coupled with the control unit or comprising the control unit.

A third aspect of the disclosure pertains to a computer-implemented method for planning an earth-moving operation using a construction machine, for instance according to the second aspect of the disclosure, wherein the construction machine has a tool for performing an earth-moving operation and a machine control unit for at least partially controlling the earth-moving operation. The method comprises:

receiving 3D measuring data of an uneven terrain in a surrounding of the construction machine in at least a first detection range;

capturing context image data of the terrain within the first detection range using a context camera having a known position relative to the 3D measuring data and/or to a measuring system capturing the 3D measuring data;

displaying at least one context image based on the context image data to an operator of the construction machine;

receiving user input from the operator, the user input being interpretable as or comprising a selection of pixels of the context image;

interpreting the user input as a selection of pixels of the context image;

mapping, taking into consideration the known relative position of the context camera, the selection of pixels to a surface of the 3D terrain model;

determining, based on the mapping, 3D coordinates in the 3D terrain model on the surface; and providing the 3D coordinates to the machine control unit for at least partially controlling the earth-moving operation based on the 3D coordinates.

According to one embodiment of the method, receiving the 3D measuring data comprises capturing the 3D measuring data using at least one measuring unit at the construction machine, the at least one measuring unit comprising a laser scanner and/or a plurality of ToF cameras. For instance, the 3D measuring data may comprise 3D point cloud data. According to another embodiment of the method, the user input comprises an input on a touch-sensitive screen, on which the context image is displayed, the selection of pixels of the context image comprising drawing at least one line or polygon in the context image, e.g. using either touch-and-drag or swipe motions.

In some embodiments, the earth-moving operation comprises constructing a linear structure, and the line or polygon indicates a position and/or direction of the linear structure. For instance, the linear structure may be a road bed, a track bed, an embankment, a causeway, a dam, a cut, a trench or a ditch. Optionally, the user input comprises an indication that the earth-moving operation comprises constructing a linear structure, e.g. an indication that a road bed, a track bed, an embankment, a causeway, a dam, a cut, a trench or a ditch is constructed. In one embodiment, at least one line indicates a centerline or an edge of the linear structure. Optionally, the user input comprises a selection of a desired slope of the linear structure.

In one embodiment, the linear structure is a trench or a ditch, and the user input comprises a selection or indication of a desired extrusion shape of the trench or ditch, wherein a spline indicating the position and direction of the trench or ditch is projected into a locally horizontal plane. The extrusion shape may be defined by two or more line segments in a vertical plane perpendicular to the projection of the spline, for instance wherein the line segments are indicated by the user input on the touch-sensitive screen by a touch-and-drag motion or by several touches selecting subsequent point locations. Alternatively, the extrusion shape is defined by a desired width and depth, having a horizontally flat bottom at the desired depth from the spline and flat vertical walls parallel to the spline.

In one embodiment, the method comprises analysing the user input to determine whether it comprises one or more changes in the direction of the trench or ditch, wherein, in response to detecting direction changes, determining 3D coordinates further comprises enforcing a minimum turning radius based on the extrusion shape, determining intersections of the extrusions, e.g. in the case of a sharp change in direction, and/or adding a piecewise linear approximation of a radius in the extrusion shape.

According to some embodiments of the method, the user input comprises designating locations for the construction machine, for a spoil pile, for a windrow line and/or for a truck lineup, particularly relative to a site or features of the earth-moving operation.

In one embodiment, the construction machine is an excavator and the user input comprises an indication that the excavator is to dig over the front or rear or over a side of tracks of the excavator.

In another embodiment, designating the location of the spoil pile comprises using the construction machine to dig a first load of soil and deposit it at a desired starting location for the spoil pile, for instance wherein the designated location for the spoil pile indicates a centre line for the spoil pile or a limit line for the spoil pile with respect to the nearest distance to the earth-moving operation.

In another embodiment, designating the location of the truck lineup comprises inputting a desired approach vector for the truck, e.g. on a touch-sensitive display. Optionally, the desired approach vector may be provided to a truck and used for navigational calculations to plan a path for the truck to reach the designated location along the desired approach vector, and the calculated path may be communicated to an operator of the truck and/or used to generate autonomous navigation commands for the truck.

A fourth aspect of the disclosure pertains to a computer programme product comprising programme code which is stored on a machine-readable medium, or being embodied by an electromagnetic wave comprising a programme code segment, and having computer-executable instructions for performing, particularly when executed on a computing unit of a system according to the first aspect of the disclosure, the method according to the third aspect of the disclosure.

BRIEF DESCRIPTION OF THE DRAWINGS

By way of example only, aspects will be described more fully hereinafter with reference to the accompanying figures, wherein.

DETAILED DESCRIPTION

Figure 1A:
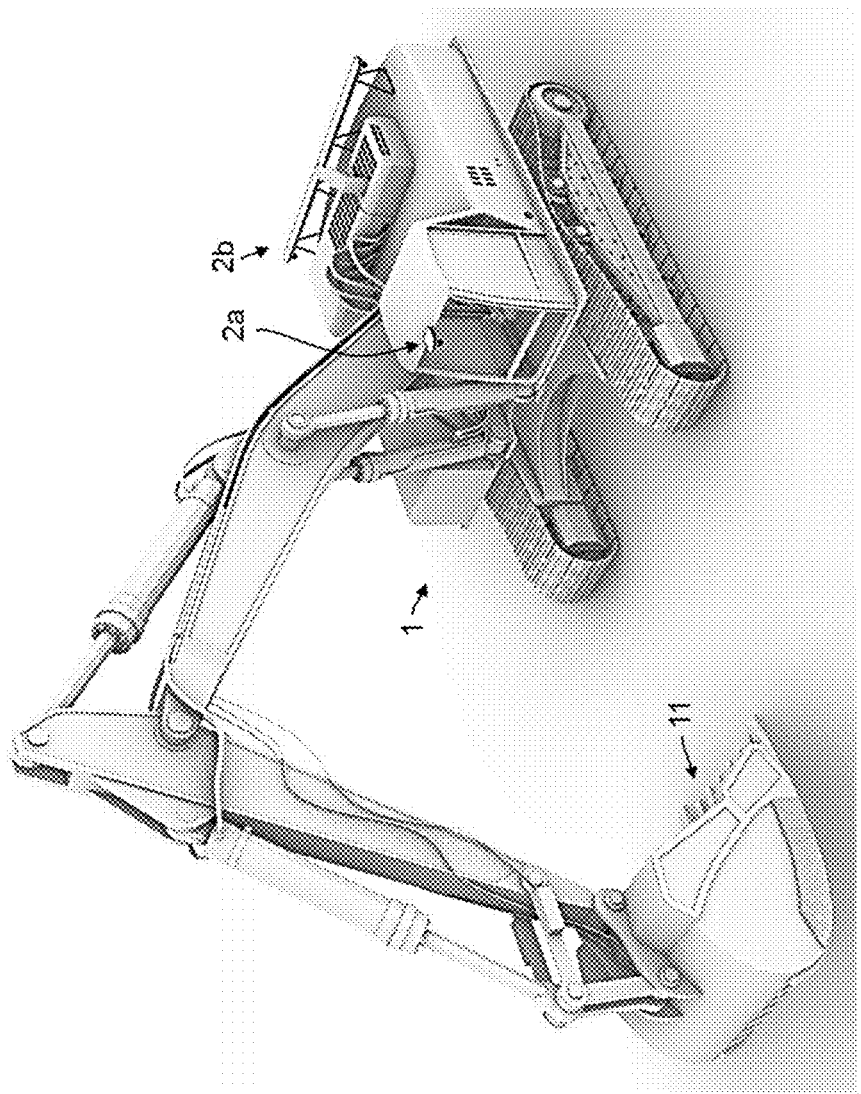
FIGS. 1*a-c* show an exemplary embodiment of a construction machine 1 comprising a construction site measuring system.
Figure 1B:
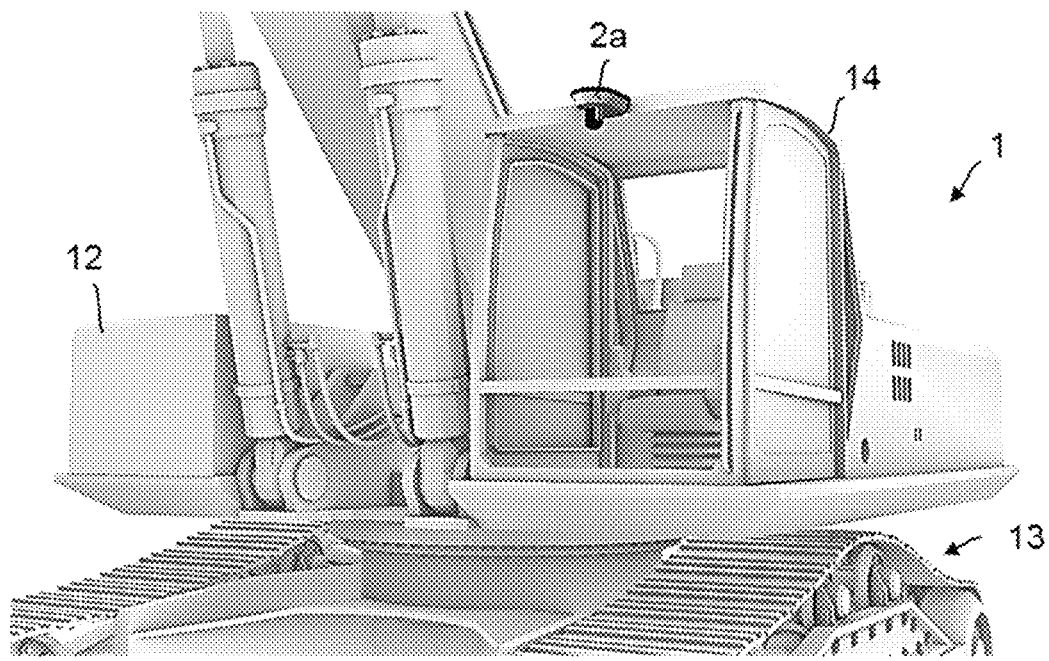
Figure 1C:
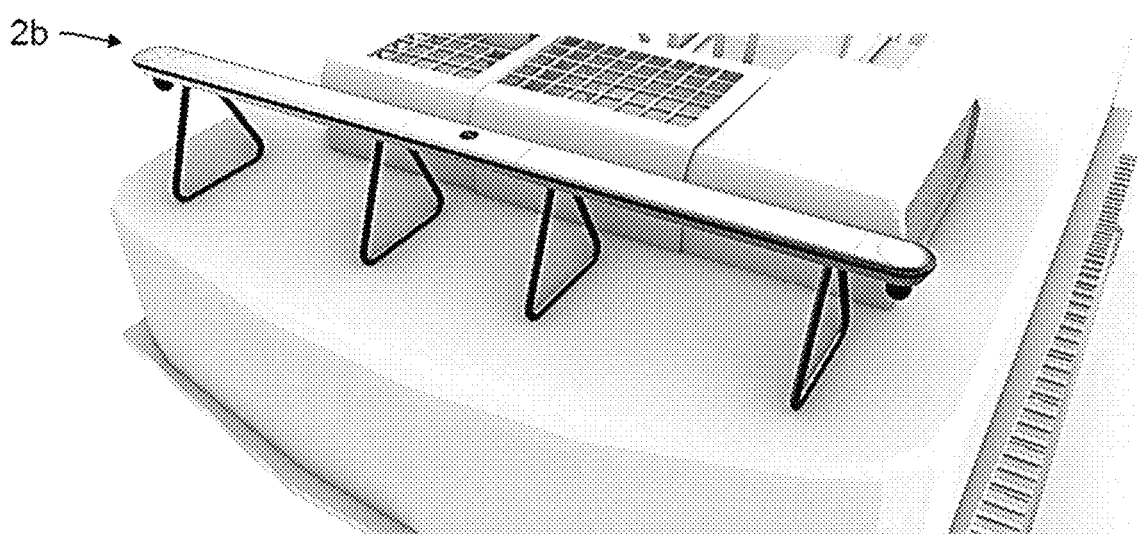

FIGS. 1*a-c* show an exemplary embodiment of a construction machine 1 comprising a construction site measuring system. The construction machine 1 comprises a tool 11 for performing earthmoving works. Although the shown machine is an excavator, it could as well be any other construction machine usable in earthmoving works, such as a grader or a dozer.

A method and system provide a simplified workflow to design a 3D surface plan, wherein the workflow is intuitive to an operator of the construction machine 1. The 3D surface plan designed by the operator may then be used for earthmoving operations using existing automation systems of the construction machine 1. In some embodiments, such a method and system require a construction site measuring system that is able to sense the environment, generate a point cloud based on the sensed environment, and merge the point cloud and colour data from a context camera. They also need a display that shows the camera image to the operator and input means for receiving operator input.

FIG. 1*a* shows two measuring units 2*a,b* that are mounted on the excavator 1 as part of the construction site measuring system. Each measuring unit 2*a,b* comprises one or more reality-capture devices (RCD). In this context, an RCD in particular comprises a sensor arrangement to capture a point cloud of the environment using a non-contact method. Typically, this is based on time-of-flight (ToF) measurements based on light waves, radio waves, or ultrasonic sound waves. However, stereoscopic vision sensors can provide point-cloud measurements of the environment using disparity, or the difference in position of data in the left and right images. For instance, each RCD may comprise at least two cameras and optionally other sensors, such as a laser scanner or an arrangement of ToF cameras. As shown in more detail in FIG. 1*b*, a first measuring unit 2*a* comprising a single RCD is mounted onto a cab 14 of the excavator 1. As usual for construction machines, the excavator 1 has a chassis 12 and a powertrain 13. Alternatively, the construction machine may have wheels. As shown in FIG. 1*c*, a second measuring unit 2*b* comprising three RCDs is mounted on the back of the chassis 11. The measuring units 2*a,b* may be configured to contribute to generating the same 3D point cloud of the terrain, to detect obstacles and/or to track persons or animals entering a danger zone around the machine. Measuring units may be provided on many parts of the construction machine, for instance on the tool 11, the chassis 12 and/or the cab 14.

The construction site measuring system comprises a computing unit and a user interface (not shown here). Preferably, the user interface may be provided at or inside the cab 14 so that it may be used by an operator of the excavator 1 during operation. The user interface comprises a display for displaying live images and/or a graphical user interface (GUI), and input devices—e.g. comprising a touch-sensitive display (touchscreen) and a stylus for use with the touchscreen.

The computing unit can use the measuring data generated by the measuring unit (RCD data)—e.g. LiDAR data from a LiDAR scanner and image data from a multitude of cameras—for generating a 3D model, e.g. of the construction site or parts thereof, and optionally also for obstacle detection.

The construction site measuring system additionally may comprise at least one of the following components, which optionally may be provided in a common housing together with the RCD of a measuring unit 2a,b or in a common housing together with the computing unit and the user interface:
- a GNSS-antenna configured for generating position data,
- an Inertial Measurement Unit (IMU) configured for generating IMU data, and
- a cellular unit configured for transmitting any data to a remote station or other vehicles, e.g. construction machines or haul trucks on the same construction site.

For instance, if the measuring data comprises LiDAR data and image data, the image data can be used for colouring the LiDAR data and/or for optimizing a referencing of the LiDAR data by matching them with an image-based generated point cloud (e.g. generated by a visual simultaneous localization and mapping (VSLAM) algorithm). Also a feature tracking and/or feature recognition algorithm can help combining the LiDAR data to a consistent and well-referenced global point cloud. Similarly, the position data gained with the GNSS-antenna and the IMU data from the IMU can be used for a sensor fusion to obtain a higher precision when building a 3D model of the terrain. A VSLAM point cloud generation can also be supported on LiDAR data, in particular in such a way that the LiDAR data introduce scale and thereby increase stability of the algorithm. The LiDAR scanners may be configured for generating the LiDAR data while the two rotation axes of each scanner rotate faster than 0.1 Hz, particularly faster than 1 Hz, with a point acquisition rate of at least 300,000 points per second, particularly at least 500,000 points per second. LiDAR scanners—as well as ToF cameras—may be capable to capture a 3D representation of the surrounding at a very fast pace. Therefore, with a moving construction machine it is possible to generate a coherent 3D point cloud based on a SLAM (Simultaneous Localization and Mapping) algorithm that uses the LiDAR data or the ToF data—either alone or in combination with image data from the cameras. Such localization and mapping is specifically advantageous if the construction machine is operating under a bridge or some other place shadowed from GNSS signals. The SLAM algorithm may be supported by at least one IMU providing IMU data that may be processed to stabilize the algorithm. In particular, all such fused sensor data can be processed by a Kalman filter.

The construction site measuring system also comprises at least one context camera. This is any camera device that generates an image that provides context of the environment. In particular, the context camera need not provide any data for use in a sensor system. However, images provided by a stereoscopic camera are suitable for use as a context camera in addition to their use as a sensor through the calculation of a disparity map. The context camera may be provided in a common housing together with the RCD of a measuring unit 2a,b or in a common housing together with the computing unit and the user interface. For instance, in the shown example, it may be provided in the first measuring unit 2a.

The context image data is related to the RCD data of the construction site measuring system through the use of extrinsic parameters, which characterize the relative position of the context camera and RCDs as they are mounted on the construction machine 1. Images taken by the context camera are displayable to the operator of the machine on the display of the user interface, particularly as a live video.

The use of one or more RCDs mounted to the construction machine enables the entire work plan to be localized to the site based on the RCD data. If the RCDs are used for navigation or mapping (e.g. some variant of SLAM), then a design file can be localized to that navigation frame. If the machine is outfitted with GNSS or another global localization system, then the RCD data can be localized to global coordinates and the design file can be localized to the world frame as well. The design file can then be saved and output for reference or later use.

Figure 2:
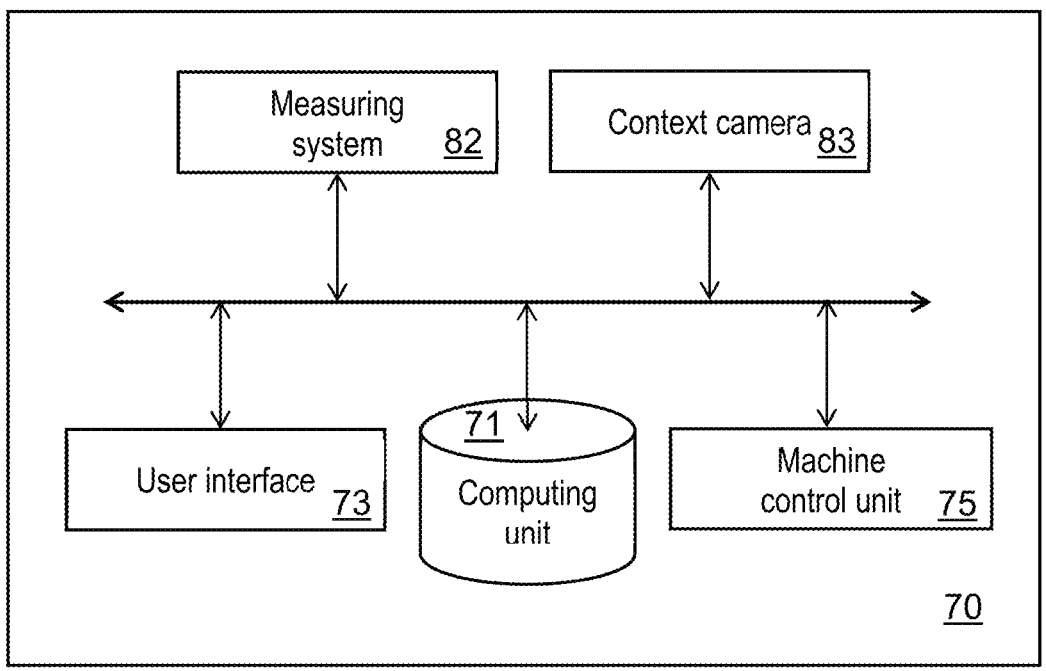
FIG. 2 illustrates an exemplary embodiment of a system.

FIG. 2 illustrates an exemplary embodiment of a system 70. It may be provided at least partially on a construction machine, e.g. on the excavator of FIG. 1a. The system 70 comprises a computing unit 71 that is operatively coupled with a user interface 73. The user interface is configured to present information to an operator of the system and to receive input from the operator. For instance, the user interface 73 may be provided in the cab of the excavator of FIG. 1a and comprise a touchscreen.

The system may further comprise a machine control unit 75 operatively coupled with the computing unit 71. The machine control unit 75 is configured to aid the operator in performing earth-moving operations. In particular, this includes at least partially automatically supervising coordinates of a tool of the construction machine, for instance so that the tool of the excavator of FIG. 1a is prevented from digging below a pre-defined plane. Alternatively, the machine control unit 75 may be provided separately on the construction machine and be connectable to the system 70 so that it is operatively coupled with the computing unit 71.

The system 70 may also comprise one or more reality capture devices (RCD) 82 and at least one context camera 83 that are operatively coupled with the computing unit 71. An image of the context camera 83 is displayable on a screen, e.g. a touchscreen, of the user interface 73. Alternatively, the RCD 82 and context camera 83 may be provided separately on the construction machine and be connectable to the system 70 so that they are operatively coupled with the computing unit 71.

The computing unit 71 is configured to receive, from the RCD 82, point cloud data of a surface of a construction site, particularly of a surface of the surrounding of the construction machine. The computing unit 71 is configured to receive, from the user interface 73, user input regarding a planned earth-moving operation on the construction site. The user input comprises a selection of pixels in the images of the context camera—or is at least interpretable as a selection of pixels. By mapping the selected pixels onto the point cloud data, the computing unit 71 determines 3D coordinates of the planned earth-moving operation and programmes the machine control unit 75 accordingly.

Figure 3A:
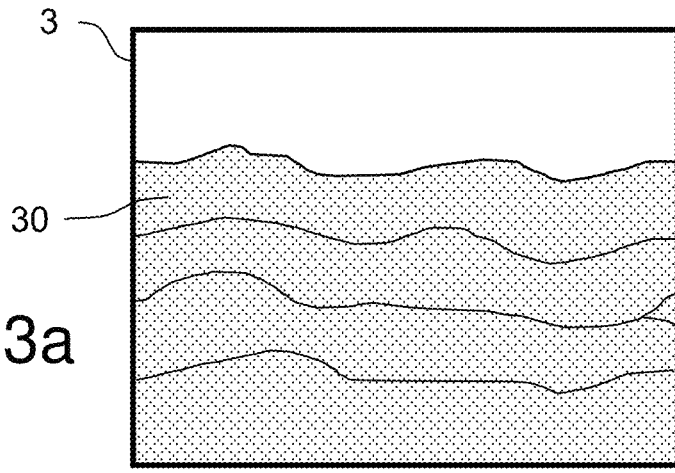
FIGS. 3*a-b* shows a context image displayed to the operator and a user inputting a line in the displayed image.

FIG. 3a shows an image 3 taken by the context camera that is displayed to the operator of the construction machine on the display of the user interface. This context image 3 shows a representation of a part of a surrounding of the construction machine. The surrounding comprises a terrain 30 in which an earth-moving operation is to be performed, wherein 3D features 31 in the surrounding, such as terrain roughness or obstacles, are also visible in the image 3. Preferably, to increase the intuitiveness of the workflow, the context camera may be positioned and directed so that it captures images in the actual or normal viewing direction of the operator—e.g. positioned on top or at the front of the operator's cab. This way, the part of the surrounding shown in the image 3 at least partially corresponds to what is visible for the operator from within the cab of the construction machine.

Figure 3B:
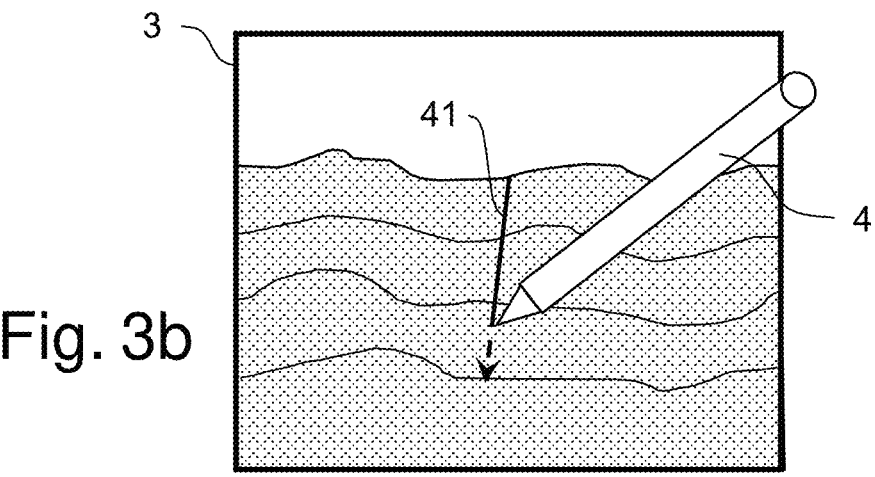

As shown in FIG. 3*b*, the operator may define a position of a planned earthmoving operation in the image 3. The display, on which the image 3 is displayed, may be a touchscreen and the operator may use a stylus 4 as an input device to define the position on the touchscreen. In the example of FIG. 2*b*, the planned earthmoving operation comprises digging a trench, and the operator uses the stylus 4 to draw a line 31 for defining a location and direction of the trench. The line 31 touches a plurality of pixels that can be interpreted as a selection of pixels in the image 3 (pixels of interest). Alternatively, other or additional input devices such as a keyboard may be used.

For instance, a mouse or trackball may be used as input device to move a cursor in the image 3. Using a mouse or trackball, defining the location and direction of the trench may include clicking the starting point and the end point of the trench in the image 3, or clicking the starting point and dragging along line 31 to the end point. Similarly, using a touchscreen, defining the location and direction of the trench may include touching the starting and end points on the touchscreen (e.g. with a finger or using the stylus 4) or touching and dragging. Alternatively, the location and direction of the trench may be defined by selecting pixels using a keyboard or any other suitable method.

Figure 4:
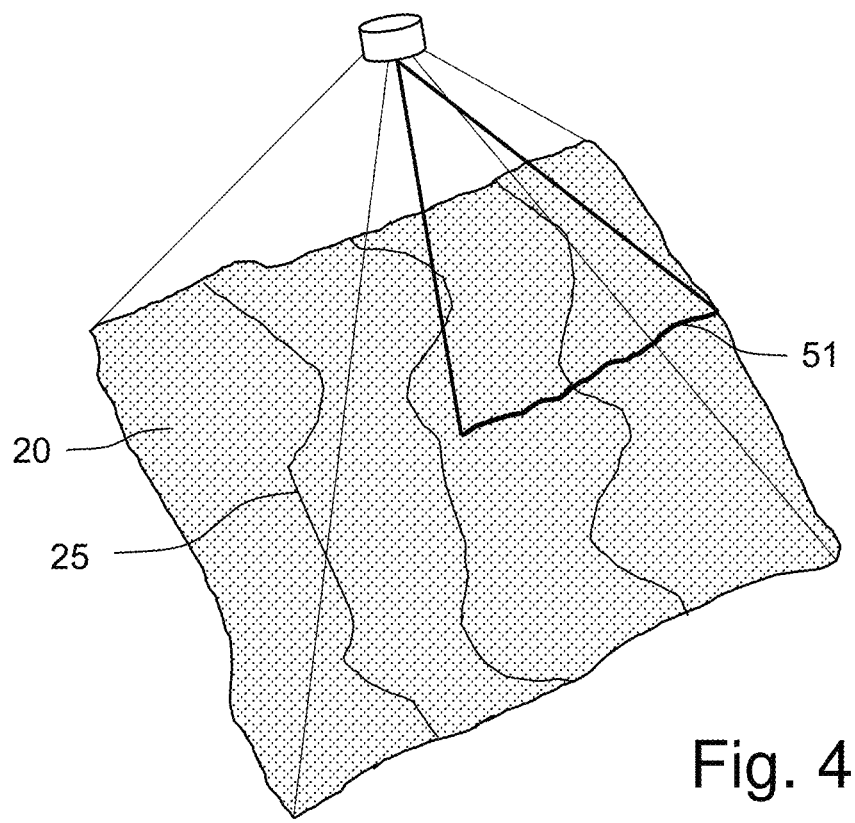
FIG. 4 illustrates a mapping of the input line to the 3D surface.
Figure 5:
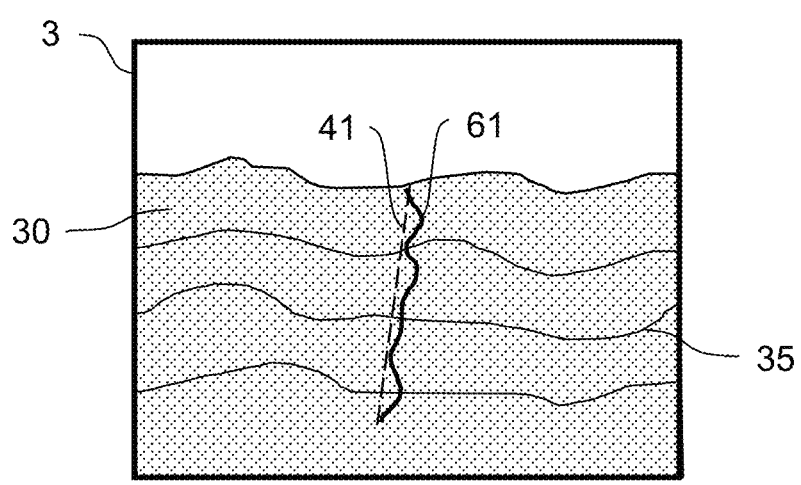
FIG. 5 illustrates an overlay displayed on the context image as feedback to the operator how the system has interpreted the input line.

Irrespective of the input method for defining the location and direction of the trench, the operator input in the image 3 is used to designate a set of pixels of interest. As illustrated in FIG. 4, these pixels of interest are then related to the environment of the construction machine using the extrinsic parameters by which the context image data is related to the RCD data, characterizing the relative position of the context camera and the one or more RCDs. The pixel coordinates of the pixels of interest are converted into 3D coordinates relating to the point cloud data from the RCDs. The RCD point cloud data comprises a 3D representation of the surface 20 of the surrounding including 3D features 25, such as terrain roughness or obstacles. This step may involve interpolating 3D points or simplifying the 3D representation from point clouds to simple surfaces so that the projection of points or lines onto the 3D representation is simpler mathematically. The 3D position of the pixels is then smoothed so that it matches an assumed operator intent. That is, a line input 41 on the screen by the operator will result in an irregular path in 3D space of the point cloud data if the surface 20 is uneven. This path is then smoothed so that a line 51 is generated. As shown in FIG. 5, the system may generate an overlay on the context camera image 3 based on the operator's input line 41 and show the operator the 3D surface line 61 as received by the system. This enables the operator to confirm that the system has correctly interpreted the operator input line 41 when designing a 3D plan where the existing surface has a slope. Optionally, the system may also re-project the image 3 and the line 61 to generate a top-down view.

Figure 6:
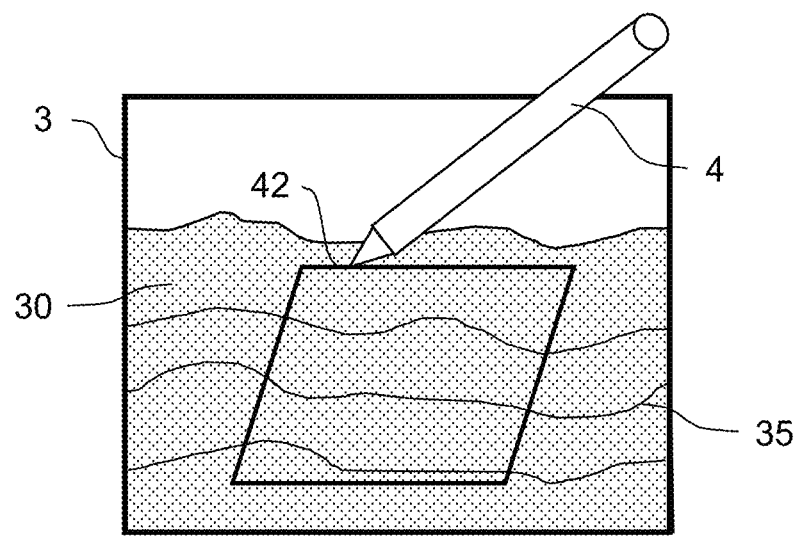
FIG. 6 illustrates a user inputting a polygon in the displayed image.

As shown in FIG. 6, the operator may use the stylus 4 to define a position of a planned earthmoving operation in the image 3 by inputting a polygon 42 instead of a single line—for instance to define the extent of a planned pit.

Figure 7:
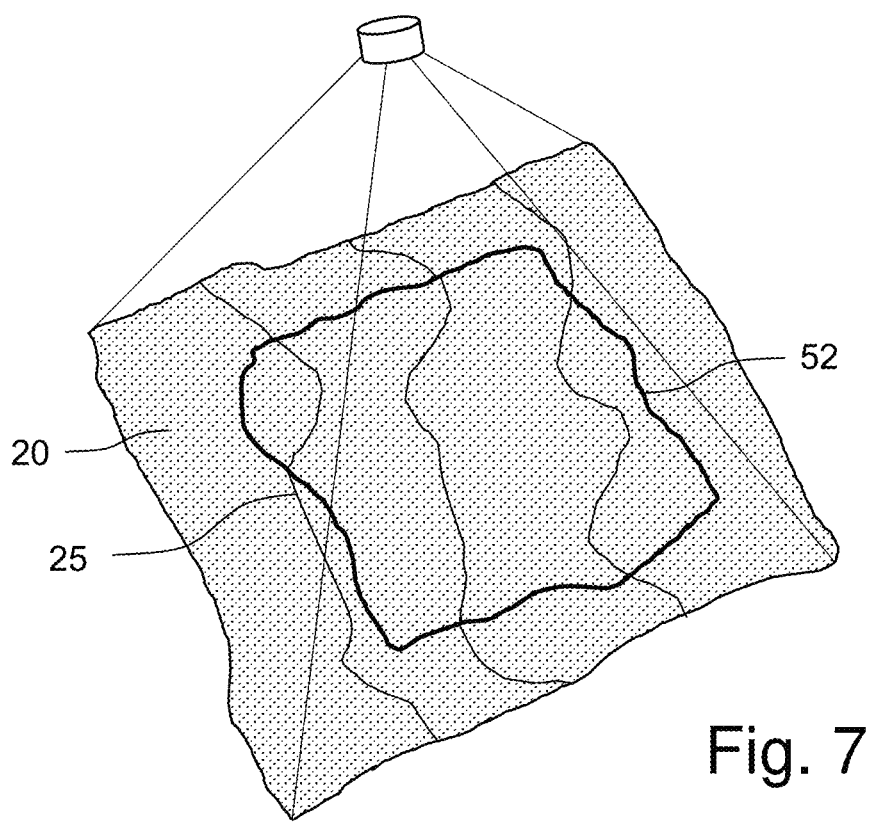
FIG. 7 illustrates a mapping of the input polygon to the 3D surface.

As illustrated in FIG. 7, the operator input in the image 3 is used to designate a set of pixels of interest. These pixels of interest are then related to the environment of the construction machine using the extrinsic parameters as described above with respect to FIG. 4, i.e. a known position of the context camera relative to the point cloud data. The 3D position of the pixels is then smoothed so that it matches an assumed operator intent. That is, rules must be applied to ensure that the operator intent is maintained if the operator inputs a polygon 42 on the screen. Since a square or rectangle drawn on screen does not necessarily correspond to a square or rectangle on the ground surface 20, the polygon input 42 by the operator will result in an irregular area in 3D space of the point cloud data if the surface 20 is uneven. Therefore, rules must be employed to normalize the line segments after smoothing, so that an outline 52 on the surface 20 is generated. Again, the system may generate an overlay on the context camera image based on the operator's input polygon and show the operator the 3D surface outline as received by the system.

The system may also enable the operator to use combinations of selections to configure desired surfaces. In preferred embodiments, the system is capable to generate lines parallel to lines provided by the operator input and/or to generate planes from lines provided by the operator input. Further, the system may enable the operator to input a desired slope and its direction and is configured to move lines or planes provided by the operator input so that a plane lies at the desired slope.

Figure 8A:
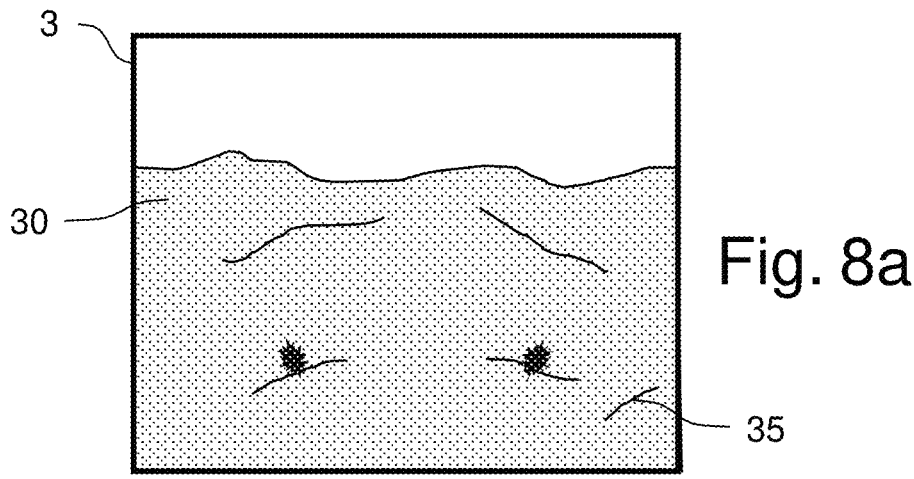
FIGS. 8*a-e* illustrate inputting a design for a V trench in the displayed image.
Figure 8B:
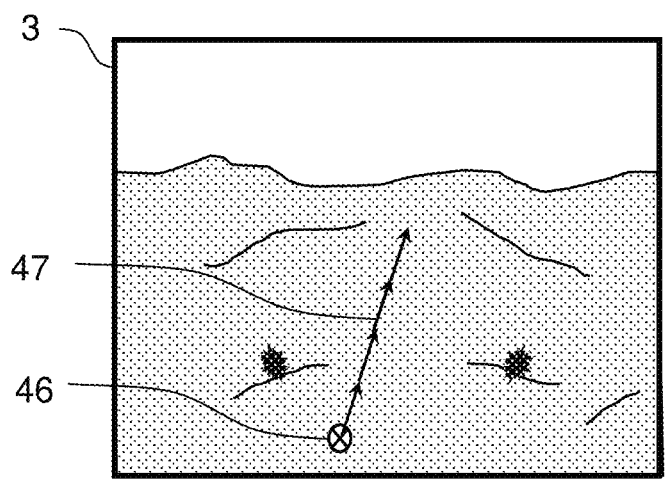

FIGS. 8*a-e* illustrate an example, wherein the system enables an operator to design a flat-bottomed V trench. In FIG. 8*a*, the context image 3 is displayed to the operator, showing the surface 30 and surface features 35. In FIG. 8*b*, the operator defines a line for the trench using a touch 46 and drag 47 input on a touch screen. The operator may further select the designated line and set it to lie in the horizontal plane and/or designate it normal to a construction plane.

Figure 8C:
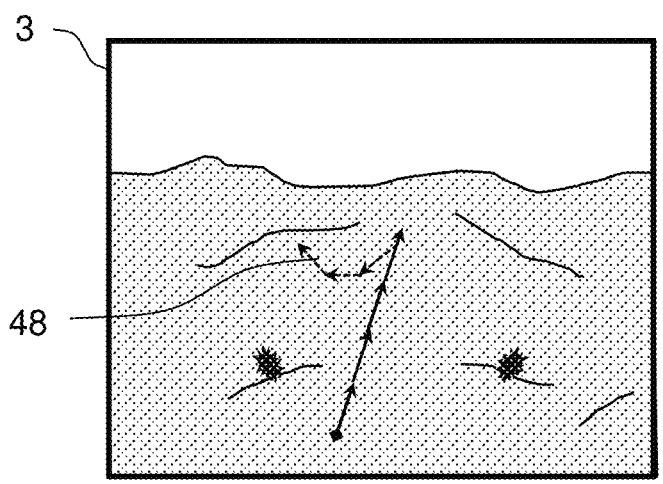
Figure 8D:
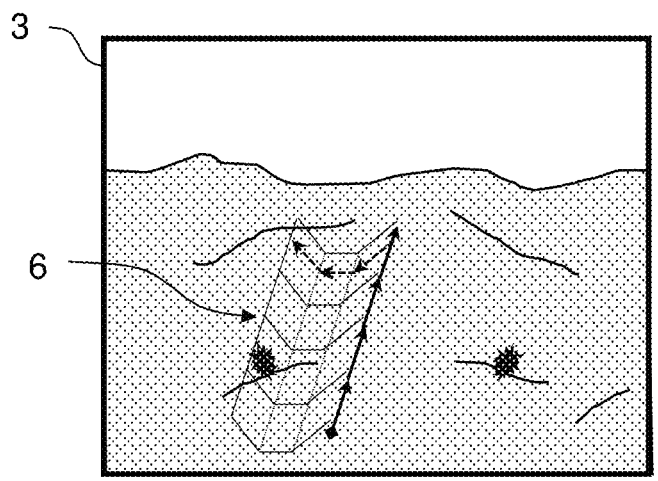

In FIG. 8*c*, the operator inputs the layout of the trench profile 48 in the construction plane, e.g. using three touch and drag inputs on the touch screen. This may include a Snap-On functionality. The operator may configure the angles of the line drawn on the construction plane so that the slopes and locations of the corners are in the desired locations. In FIG. 8*d*, the operator extrudes the desired profile along the main line for the trench 6.

Figure 8E:
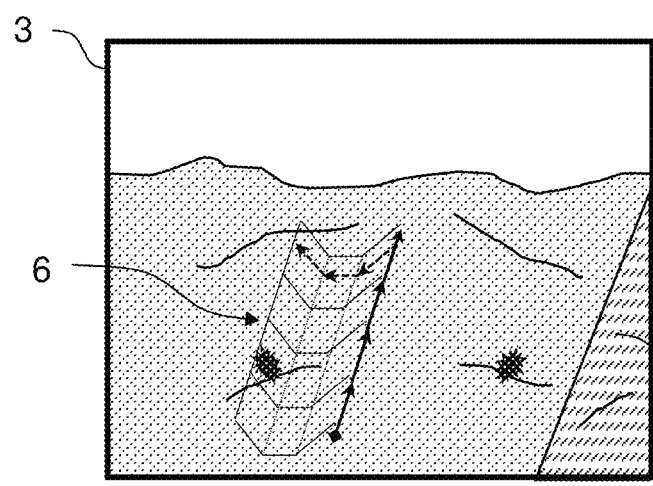

In FIG. 8*e*, the operator configures a further line, e.g. parallel to the main line of the trench 6, and designates it as the spoil location 7, where excavated material is to be placed. The operator may configure a further line parallel to the main line of the trench 6 and designate it as the navigation line for the excavator while it is cutting the trench 6.

The operator may also configure a windrow line next to the trench 6. Optionally, depending on the used construction machine and on the specifications of the earth-moving operation, the system may suggest one or more positions of the windrow (e.g. a position on each side of a trench 6), for the operator to select.

The system may also be used during the earth-moving operation, in which case the operator may finish construction of the currently designed surfaces and then use those surfaces as registration surfaces for the construction of additional design surfaces. Optionally, the system can be used to designate the desired centrelines of grading passes for slot dozing, or the desired centrelines for the furloughs between slot dozing passes. These might then be used to configure the system to cast material left or right depending on the current navigation position of the machine and the desired spoil location.

Figure 9:
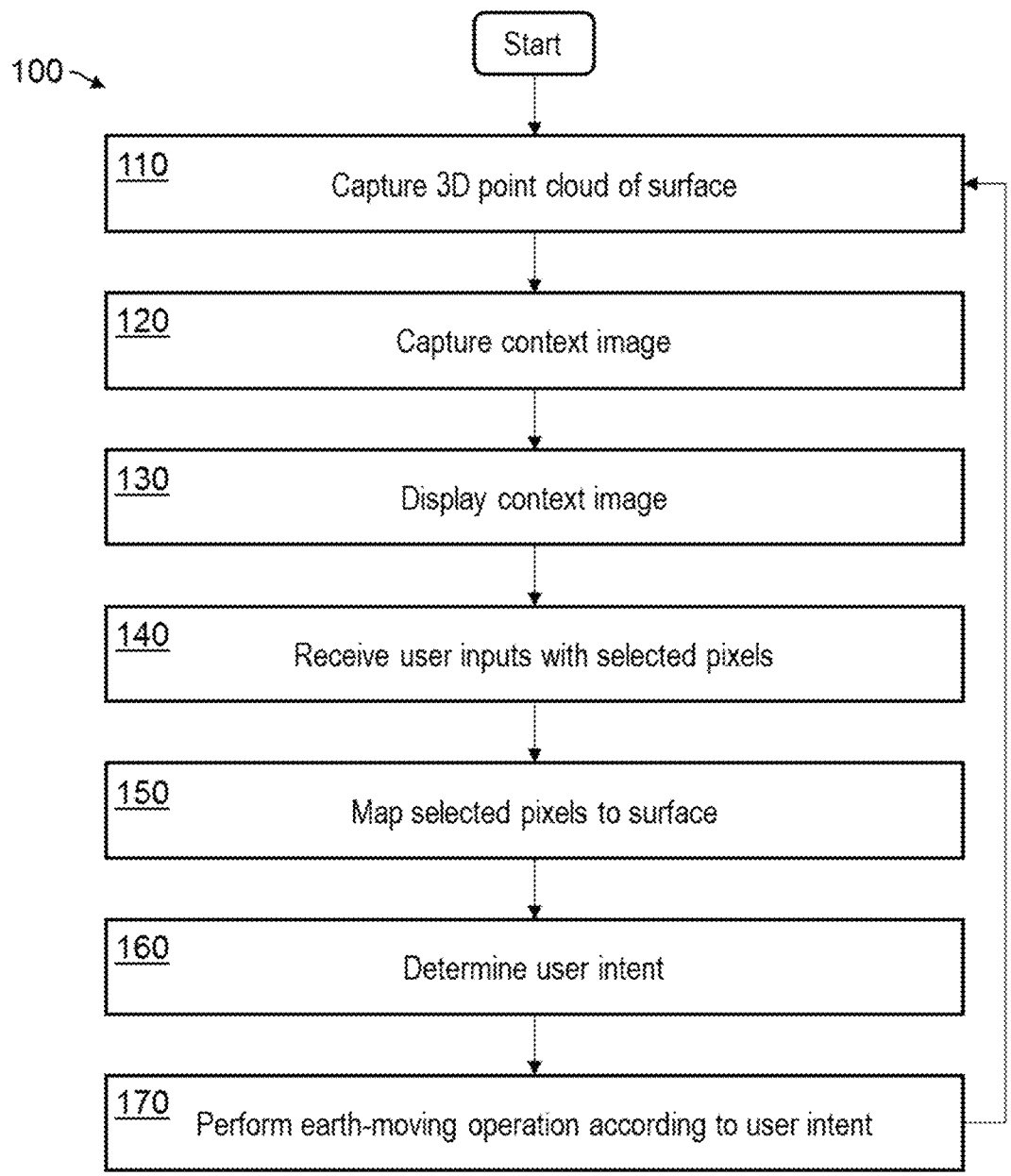
FIG. 9 illustrates steps of a method.

FIG. 9 is a flow chart illustrating an exemplary embodiment of a method 100. The illustrated steps are not necessarily performed in the shown order.

A three-dimensional point cloud of a 3D surface is captured 110, for instance using one or more reality-capture devices (RCD) mounted on a construction machine to capture the surface surrounding the machine. A context image is captured 120 showing at least a part of the surrounding. This image is displayed 130 as a 2D image to a user, e.g. to an operator of the construction machine. A user input comprising a selection of pixels from this 2D image is received 140. For instance, the input may be performed on a touchscreen on which the context image is displayed. The selected pixels relate to a planned earth-moving operation to be performed in the surrounding using the construction machine.

The pixels selected in the 2D image are then mapped 150 to 3D surface points of the point cloud. Based thereon, the intent of the user is determined 160, the user intent comprising determining 3D coordinates that were intended by the user when inputting a pixel selection in the 2D image. The 3D coordinates are then used to perform 170 the earth-moving operation as intended by the operator. For instance, this may comprise providing the 3D coordinates to a machine control unit of the construction machine. Optionally, the method 100 may be continued during the earth-moving operation, so that the user intent may be updated continuously.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A system for planning an earth-moving operation to be performed by a construction machine, the construction machine having a tool for performing the earth-moving operation and a machine control unit for at least partially controlling the earth-moving operation, the system comprising:
   a measuring system configured for capturing three-dimensional measuring data of an uneven terrain in a surrounding of the construction machine in at least a first detection range;
   a context camera having a known position relative to the measuring system and/or the three-dimensional measuring data and being configured for capturing context image data of the terrain within the first detection range;
   a user interface configured for displaying at least one context image based on the context image data to an operator of the construction machine, and for receiving user input from the operator of the construction machine, the user input being interpretable as or comprising a selection of pixels of the context image; and
   a computing unit operatively coupled at least with the measuring system and the user interface,
   wherein the computing unit is configured for:
      generating, based on the three-dimensional measuring data, a three-dimensional terrain model of the terrain within the first detection range,
      interpreting the user input as a selection of pixels of the context image;
      mapping, taking into consideration the known relative position of the context camera, the selection of pixels to a surface of the three-dimensional terrain model;
      determining 3D coordinates on the surface based on the mapping; and
      providing the 3D coordinates to the machine control unit for at least partially controlling the earth-moving operation based on the 3D coordinates.

2. The system according to claim 1, wherein the measuring system comprises at least one measuring unit at the construction machine, each measuring unit comprising at least one laser scanner and/or a plurality of ToF cameras and being configured for capturing 3D point cloud data.

3. The system according to claim 1, wherein the user interface comprises a touch-sensitive display on which the context image is displayed and on which the user input is received, wherein the user input is interpretable as or comprises a selection of at least one line or polygon of pixels of the context image.

4. The system according to claim 3, wherein the earth-moving operation comprises constructing a linear structure, and the line or polygon indicates a position and/or direction of the linear structure, particularly wherein:
   the linear structure is a road bed, a track bed, an embankment, a causeway, a dam, a cut, a trench or a ditch;
   the user input comprises an indication that the earth-moving operation comprises constructing a linear structure;
   at least one line indicates a centerline or an edge of the linear structure; and/or
   the user input comprises a selection of a desired slope of the linear structure.

5. The system according to claim 4, wherein the linear structure is a trench or a ditch, and the user input comprises a selection or indication of a desired extrusion shape of the trench or ditch, and the computing unit is configured for analysing the user input to determine whether it comprises one or more changes in the direction of the trench or ditch, and, in response to detecting direction changes, adapting the determined 3D coordinates by:
   enforcing a minimum turning radius based on the extrusion shape; and/or
   determining intersections of the extrusions, particularly in the case of a sharp change in direction; and/or
   adding a piecewise linear approximation of a radius in the extrusion shape.

6. The system according to claim 1, wherein the user interface is configured to receive the determined 3D coordinates from the computing unit and to display a representation of the 3D coordinates in the context image, particularly wherein:
   the user interface is also configured to display the selection of pixels in the context image; and/or
   the earth-moving operation comprises digging a trench and the representation comprises a spline projected into a locally horizontal plane indicating a position and direction of the trench.

7. A construction machine, in particular a grader, a dozer or an excavator, the construction machine comprising:
   a tool for performing an earth-moving operation, in particular for digging a trench;
   a control unit for at least partially controlling the earth-moving operation; and
   a system according to any one of the preceding claims, the system being operatively coupled with the control unit or comprising the control unit.

8. The construction machine of claim 7, wherein the construction machine is a grader, a dozer or an excavator.

9. A computer program product comprising programme code which is stored on a non-transitory machine-readable medium, and having computer-executable instructions for performing, particularly when executed on a computing unit of a system, the method according to claim 8.

10. A computer-implemented method for planning an earth-moving operation using a construction machine, wherein the construction machine has a tool for performing an earth-moving operation and a machine control unit for at least partially controlling the earth-moving operation, the method comprising: receiving three-dimensional measuring data of an uneven terrain in a surrounding of the construction machine in at least a first detection range; capturing context image data of the terrain within the first detection range using a context camera having a known position relative to the three-dimensional measuring data and/or to a measuring system capturing the three-dimensional measuring data; displaying at least one context image based on the context image data to an operator of the construction machine; receiving user input from the operator, the user input being interpretable as or comprising a selection of pixels of the context image; interpreting the user input as a selection of pixels of the context image; mapping, taking into consideration the known relative position of the context camera, the selection of pixels to a surface of the three-dimensional terrain model; determining, based on the mapping, 3D coordinates in the three-dimensional terrain model on the surface; and providing the 3D coordinates to the machine control unit for at least partially controlling the earth-moving operation based on the 3D coordinates.

11. The method according to claim 10, wherein receiving the three-dimensional measuring data comprises capturing the three-dimensional measuring data using at least one measuring unit at the construction machine, the at least one measuring unit comprising a laser scanner and/or a plurality of ToF cameras, particularly wherein the three-dimensional measuring data comprises 3D point cloud data.

12. The method according to claim 10, wherein the user input comprises an input on a touch-sensitive screen on which the context image is displayed, the selection of pixels of the context image comprising drawing at least one line or polygon in the context image, particularly using one of touch-and-drag and swipe motions.

13. The method according to claim 12, wherein the earth-moving operation comprises constructing a linear structure, and the line or polygon indicates a position and/or direction of the linear structure, particularly wherein:
   the linear structure is a road bed, a track bed, an embankment, a causeway, a dam, a cut, a trench or a ditch;
   the user input comprises an indication that the earth-moving operation comprises constructing a linear structure, particularly an indication that a road bed, a track bed, an embankment, a causeway, a dam, a cut, a trench or a ditch is constructed;
   at least one line indicates a centerline or an edge of the linear structure, and/or
   the user input comprises a selection of a desired slope of the linear structure.

14. The method according to claim 13, wherein the linear structure is a trench or a ditch, and the user input comprises a selection or indication of a desired extrusion shape of the trench or ditch, wherein a spline indicating the position and direction of the trench or ditch is projected into a locally horizontal plane, and:
   the extrusion shape is defined by two or more line segments in a vertical plane perpendicular to the projection of the spline, particularly wherein the line segments are indicated by the user input on the touch-sensitive screen by a touch-and-drag motion or by several touches selecting subsequent point locations; or
   the extrusion shape is defined by a desired width and depth, having a horizontally flat bottom at the desired depth from the spline and flat vertical walls parallel to the spline.

15. The method according to claim 14, comprising analysing the user input to determine whether it comprises one or more changes in the direction of the trench or ditch, wherein, in response to detecting direction changes, determining 3D coordinates further comprises:
   enforcing a minimum turning radius based on the extrusion shape; and/or
   determining intersections of the extrusions, particularly in the case of a sharp change in direction; and/or
   adding a piecewise linear approximation of a radius in the extrusion shape.

16. A computer program product comprising programme code which is stored on a non-transitory machine-readable medium, and having computer-executable instructions for performing, particularly when executed on a computing unit of a system, the method according to claim 15.

17. The method according to claim 10, wherein the user input comprises designating locations for the construction machine, for a spoil pile, for a windrow line and/or for a truck lineup, particularly relative to the earth-moving operation.

18. The method according to claim 17, wherein:
   the construction machine is an excavator and the user input comprises an indication that the excavator is to dig over the front or rear or over a side of tracks of the excavator; and/or
   designating the location of the spoil pile comprises using the construction machine to dig a first load of soil and deposit it at a desired starting location for the spoil pile, particularly wherein the designated location for the spoil pile indicates a centre line for the spoil pile or a limit line for the spoil pile with respect to the nearest distance to the earth-moving operation; and/or
   designating the location of the truck lineup comprises inputting a desired approach vector for the truck, particularly on a touch-sensitive display, particularly wherein the desired approach vector is provided to a truck and used for navigational calculations to plan a path for the truck to reach the designated location along the desired approach vector, and wherein the calculated path is communicated to an operator of the truck and/or used to generate autonomous navigation commands for the truck.

\* \* \* \* \*